US008752846B1

(12) United States Patent
White

(10) Patent No.: US 8,752,846 B1
(45) Date of Patent: Jun. 17, 2014

(54) ROLLER LOAD SUPPORT

(71) Applicant: Cascade Corporation, Portland, OR (US)

(72) Inventor: Brian Sinclair White, Victoria (AU)

(73) Assignee: Cascade Corporation, Portland, OR (US)

( * ) Notice: Subject to any disclaimer, the term of this patent is extended or adjusted under 35 U.S.C. 154(b) by 0 days.

(21) Appl. No.: 13/711,099

(22) Filed: Dec. 11, 2012

(51) Int. Cl.
B62B 3/02 (2006.01)

(52) U.S. Cl.
USPC .................................. 280/43.12; 280/79.11

(58) Field of Classification Search
USPC .............................................. 280/842, 43.12
See application file for complete search history.

(56) References Cited

U.S. PATENT DOCUMENTS

| | | | | |
|---|---|---|---|---|
| 1,425,727 | A * | 8/1922 | Wallstrom | 414/437 |
| 1,708,854 | A | 4/1929 | Stahlhut | |
| 2,178,647 | A * | 11/1939 | Raymond et al. | 280/43.12 |
| 2,234,925 | A * | 3/1941 | Hastings, Jr. | 254/2 C |
| 2,361,544 | A * | 10/1944 | Hastings, Jr. | 280/46 |
| 2,468,055 | A * | 4/1949 | Gibler | 414/528 |
| 2,550,548 | A * | 4/1951 | Framhein | 254/10 C |
| 2,570,726 | A * | 10/1951 | Smith | 414/437 |
| 2,812,080 | A | 11/1957 | Campos | |
| 3,282,598 | A * | 11/1966 | Goodwin | 280/11.208 |
| 4,355,940 | A | 10/1982 | Derickson | |
| 5,082,415 | A | 1/1992 | Hayashi | |
| 5,195,781 | A * | 3/1993 | Osawa | 280/842 |
| 5,584,354 | A * | 12/1996 | Tugnoli | 180/19.1 |
| 5,673,941 | A * | 10/1997 | Osawa | 280/842 |
| 5,901,981 | A * | 5/1999 | Lucht | 280/842 |
| 6,237,960 | B1 * | 5/2001 | Dornhofer | 280/842 |
| 6,264,417 | B1 | 7/2001 | Salsburg | |
| 6,375,204 | B1 * | 4/2002 | Tu | 280/87.042 |

(Continued)

FOREIGN PATENT DOCUMENTS

| | | |
|---|---|---|
| DE | 4321314 A1 | 1/1995 |
| JP | 6115891 A | 4/1994 |

(Continued)

OTHER PUBLICATIONS

Meijer Special Equipment, photograph and drawing of "RollerForks" load handler, 2011.

(Continued)

*Primary Examiner* — Jeffrey J Restifo
(74) *Attorney, Agent, or Firm* — Chernoff Vilhauer McClung & Stenzel, LLP

(57) ABSTRACT

A roller load support, for mounting on a load carrying vehicle such as a lift truck, has an elongate frame with a forwardly tapering vertical thickness and an upper surface for insertion beneath the underside of a load. Different longitudinally spaced pluralities of transverse upper rollers are movable upwardly to protrude through the frame's upper surface to engage the underside of the load during the insertion process. During the insertion process, the upper rollers are pushed upward by corresponding different pluralities of transverse lower rollers which rotatably engage the floor or other surface beneath the frame and frictionally counter-rotate the upper rollers. The lower rollers are spaced nonuniformly relative to each other along the length of the frame, with such spacings increasing progressively in size, within each plurality of lower rollers, in a forward direction toward the front end of the frame. Conversely, each such plurality of lower rollers has sequentially corresponding nonuniform spacings which decrease progressively in size, from plurality to plurality, in the forward direction.

13 Claims, 4 Drawing Sheets

(56) References Cited

U.S. PATENT DOCUMENTS

| | | | |
|---|---|---|---|
| 7,435,047 B2 * | 10/2008 | Meijer | 414/785 |
| 7,543,827 B2 * | 6/2009 | Mantsinen | 280/43.12 |
| 7,854,435 B2 * | 12/2010 | Campbell | 280/47.131 |
| 2007/0048117 A1 | 3/2007 | Lawless | |
| 2007/0201971 A1 | 8/2007 | Meijer | |

FOREIGN PATENT DOCUMENTS

| | | |
|---|---|---|
| NL | 1014147 C2 | 7/2001 |
| WO | 2006078156 A1 | 7/2006 |
| WO | 2011126364 A1 | 10/2011 |
| WO | 2011142662 A1 | 11/2011 |
| WO | 2013055214 A1 | 4/2013 |

OTHER PUBLICATIONS

International Search Report, mailed Dec. 11, 2013, PCT International App. No. PCT/US13/52737, Cascade Corporation, 3 pgs.

Written Opinion, mailed Dec. 11, 2013, PCT International App. No. PCT/US13/52737, Cascade Corporation, 10 pgs.

* cited by examiner

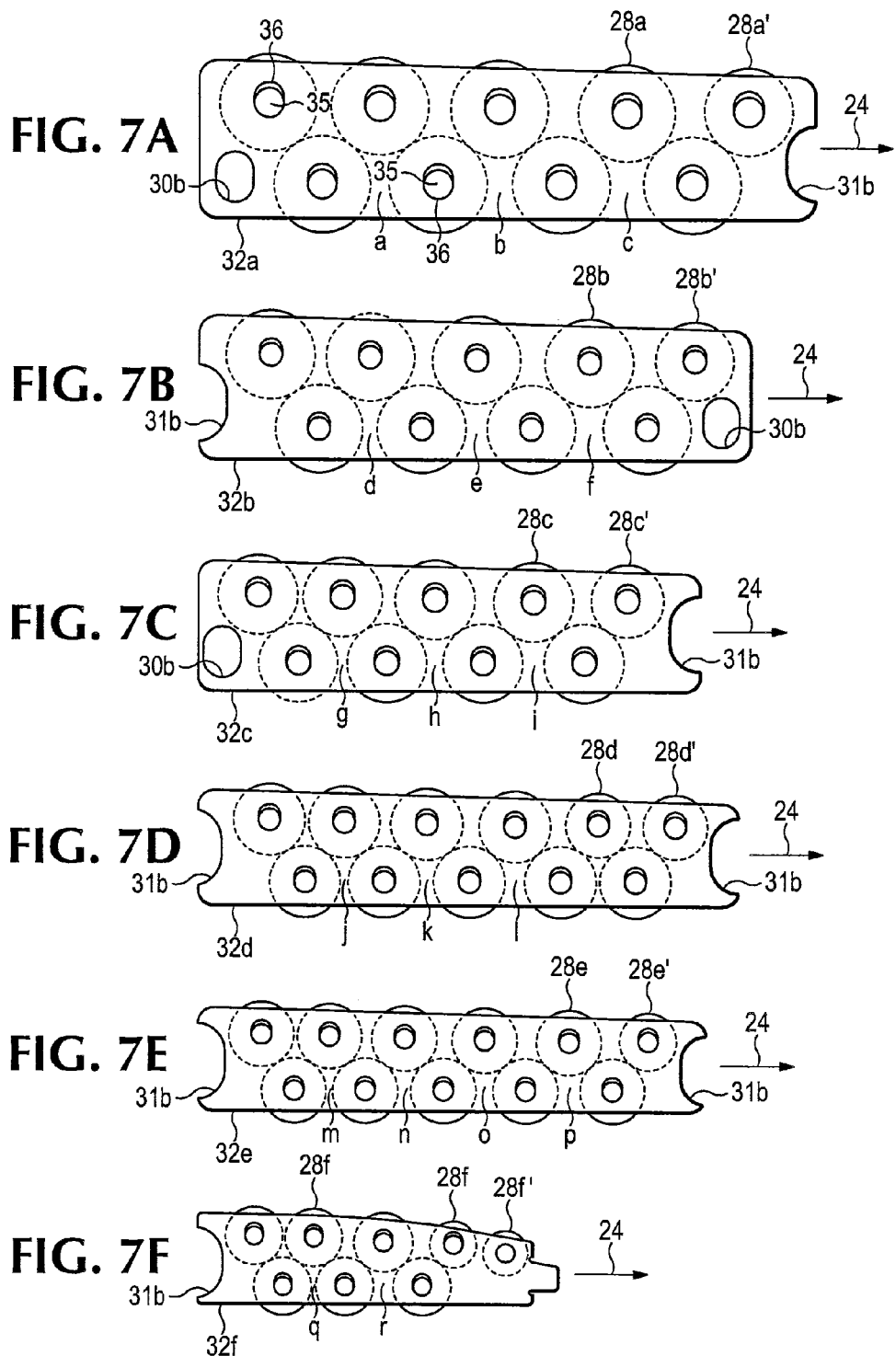

ROLLER LOAD SUPPORT

BACKGROUND OF THE INVENTION

This disclosure relates to improvements in a roller load support mountable on a load-lifting mast of a forklift truck or other industrial vehicle, for engaging the underside of a load to lift it from a floor or other load-supporting surface.

Previous such roller load supports normally have a longitudinally extending blade-like tapered frame with an upper surface for inserting below the underside of the load. The upper surface has openings through which transversely oriented load-engaging upper rollers are pushed upward by floor-engaging lower rollers to protrude above the upper surface of the frame during the insertion process. The protruding upper rollers separate the underside of the load from the frame's upper surface, to minimize the load's frictional resistance to such insertion and protect the underside of the load from damage due to contact with the frame's upper surface during insertion. Meanwhile, the frictional contact of the lower rollers with the floor during the insertion process causes the lower rollers to rotate which, due to their forceful upward contact with the undersides of the protruding upper rollers, also frictionally causes the upper rollers to rotate in contact with the underside of the load in an opposite rotational direction from the lower rollers, thereby urging the insertion of the frame surface relative to the underside of the load. When the insertion of the frame has been accomplished, subsequent lifting of the frame and load by the lift truck disengages the lower rollers from the floor, allowing both the upper and lower rollers to drop downwardly relative to the frame so that the upper rollers no longer protrude above the upper surface of the frame. This establishes a frictional resistance to relative movement between the underside of the load and the upper surface of the frame, which impedes the load from inadvertently moving longitudinally or laterally on the upper surface while the load is being transported and deposited.

A problem with such previous roller load supports is that the vertical space required to house the upper and lower rollers requires a substantial vertical thickness of the tapered frame. This thickness requirement interferes with the desired optimal blade-like tapered thinness of the frame which would make it more easily insertable beneath loads. Previous attempts to reduce the thickness of the frame have emphasized the use of upper and lower rollers in a complex mixture of nonuniform diameters and spacings which create excessive and confusing variables in the manufacture and maintenance of roller load supports.

BRIEF DESCRIPTION OF THE DRAWINGS

FIGS. 7A-7F are detail views of respective separate pluralities of the rollers of FIG. 6.

DETAILED DESCRIPTION OF EMBODIMENTS

Figure 1:
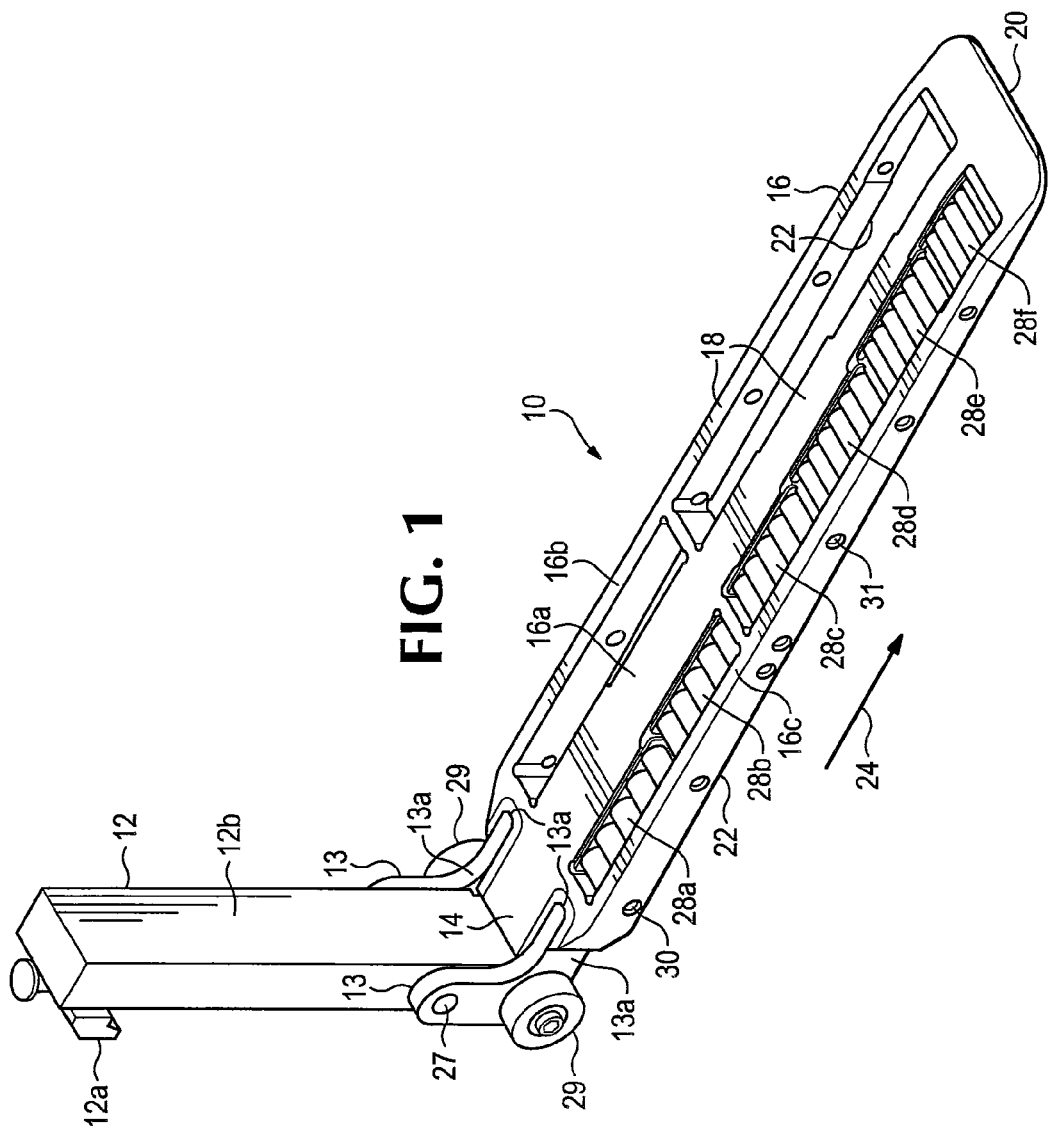
FIG. 1 is a perspective view of a preferred embodiment of a roller load support, with some of the rollers removed to show underlying structure.

FIG. 1 shows an exemplary embodiment of an improved roller load support 10 having a vertical shank 12 preferably, but not necessarily, attached by transversely spaced hinges 13 to a rear end 14 of a forwardly tapered elongate frame 16. The vertical shank 12 is similar to a vertical shank of a standard lift truck fork, and has standard attachment hardware 12a which matingly engages a standard lift truck carriage (not shown). Floor-engaging wheels 29 are rotatably attached to the respective hinges 13. In FIG. 1, the rollers have been deleted from one side of the frame 16 to show underlying structure, but are substantially the same as the rollers shown on the opposite side.

A slightly wider version of the frame 16 could alternatively be used having sufficient transverse width to provide a space beneath the upper surface 18 of the frame into which the horizontal blade of an existing standard lift truck fork (not shown) could be inserted so that the hinges 13 could be pivotally fastened to the vertical shank of the existing fork.

As a still further alternative, the frame 16 could be significantly widened and have more transversely spaced sections of rollers to create a platen type of upper surface having a much larger load-supporting area, and having either a pair of transversely spaced vertical shanks such as 12 with hinges such as 13, or a pair of spaces beneath the upper surface of the frame for accepting the insertion of a standard pair of transversely spaced existing fork blades for hinged connection to the platen in the manner described in the previous paragraph.

With further reference to FIG. 1, the exemplary elongate frame 16 has both its rear end 14 and a front end 20 interconnected longitudinally by the foregoing upper surface 18 and a lower surface 22 which converge along a longitudinal direction 24 toward the front end 20. The transversely spaced hinges 13 may be rigidly connected to the frame 16 in any convenient manner, for example by connecting their forward portions 13a to the respective sides of the rear end 14 of the frame 16. At the rear of the hinges 13, a hinge pin 27 transversely passes through the vertical shank 12 and through mating apertures in the hinges 13 to create a pivotal joint enabling the frame 16 to pivot upwardly relative to the vertical shank 12. The frame 16 is prevented from pivoting downwardly below its normal forwardly extending attitude perpendicular to the shank 12 by the abutment of the rear end 14 of the frame against the front surface 12b of the shank at its bottom.

Figure 2:
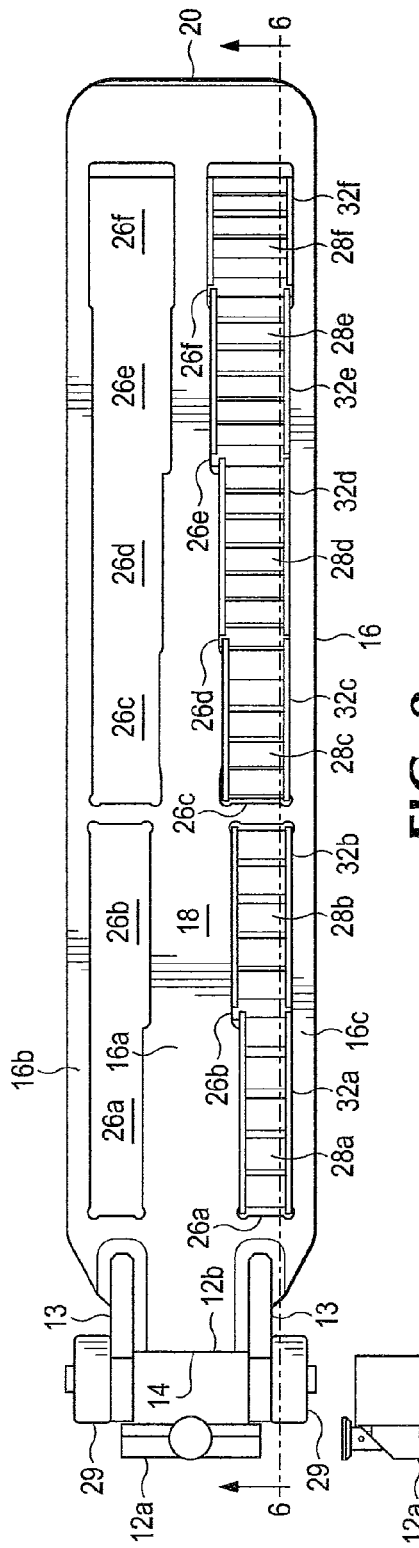
FIG. 2 is a top view of the load support of FIG. 1.

FIG. 2 shows respective transversely-spaced pairs of elongate rectangular cavities 26a, b, c, d, e and f, the respective widths of which increase toward the front end 20 of the frame 16. These pairs of transversely-spaced cavities extend completely between the upper surface 18 and lower surface 22 of the frame 16. Each such cavity is intended to house a separate plurality, such as 28a, b, c, d, e and f, of respective upper and lower rollers in rolling contact with each other, but not in rolling contact with any other plurality of rollers due to longitudinal spacings between the respective pluralities. The upper rollers of each respective plurality are arranged in a longitudinally spaced upper series adjacent to the upper surface 18 of the frame 16, and the lower rollers of each respective plurality are arranged in a longitudinally spaced lower series adjacent to the lower surface 22 of the frame 16. The respective pluralities of rollers are retained within the cavities so as to permit vertical movement of each plurality relative to the frame 16.

The movable retention of the rollers within the cavities may be accomplished in any convenient manner. For example, each space between the respective pluralities can contain one or more respective transverse retainer pins 30 or 31 (FIGS. 3-5), preferably having surrounding wear bushings 30a or 31a respectively, interconnecting an elongate inner portion 16a of the frame 16 with a respective outer elongate portion 16b or 16c of the frame as shown in FIG. 4 or 5, respectively. The pins movably retain respective transversely spaced pairs of roller cartridge sideplates 32a, b, c, d, e, f, each rotatably supporting a respective plurality of upper and lower rollers in rolling contact with each other. Each pair of cartridge sideplates preferably has independent limited vertical movability relative to the pins 30 or 31 due to vertically elongate apertures such as 30b, or vertically elongate depressions such as 31b, formed in each sideplate for movably engaging the retainer pin bushings 30a or 31a respectively, as shown in FIGS. 4, 5, 6 and 7A-F. Moreover, each upper and lower roller preferably has a respective axle, such as 35 in FIG. 7A, with protruding ends fitted loosely into vertically elongate slots such as 36 in each sideplate to permit limited vertical movability of the upper and lower rollers with respect to each other so as to maximize their mutual frictional contact regardless of any differences in the diameter of the upper and lower rollers, respectively.

Figure 3:
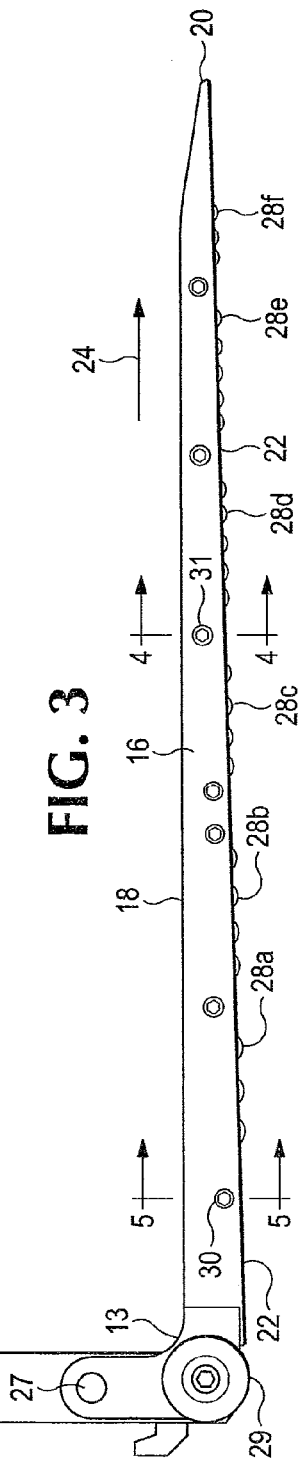
FIG. 3 is a longitudinal side view of the load support of FIG. 1.
Figure 4:
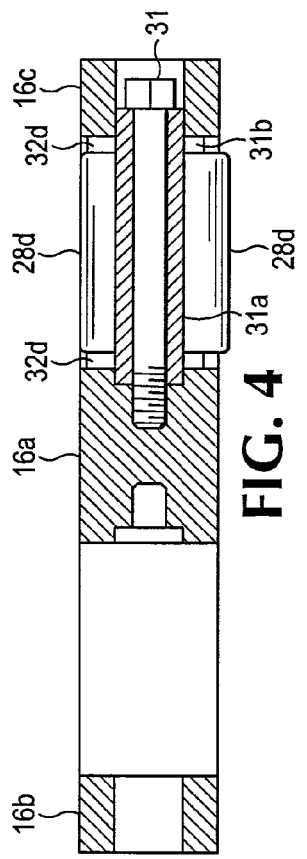
FIG. 4 is a sectional view taken along line 4-4 of FIG. 3.
Figure 5:
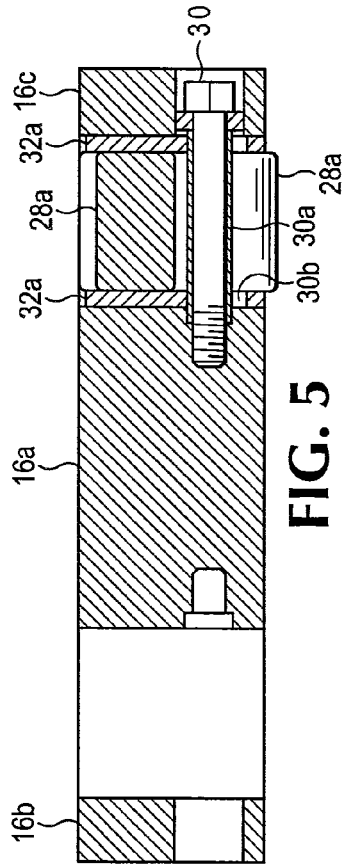
FIG. 5 is a sectional view taken along line 5-5 of FIG. 3.
Figure 6:
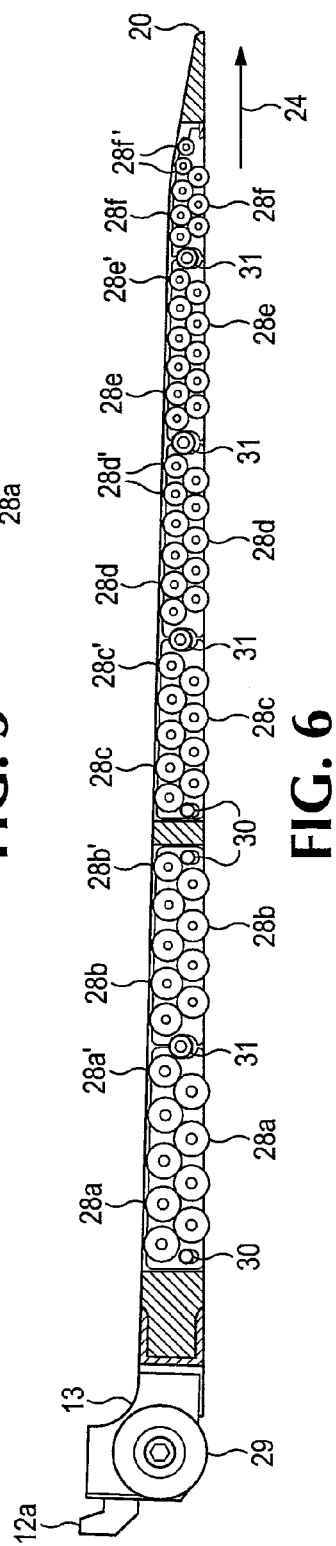
FIG. 6 is a sectional view taken along line 6-6 of FIG. 2.

When the frame 16 is elevated above a floor or other supporting surface to lift or transport a load, all of the roller cartridge sideplates are permitted to hang downwardly against the tops of the respective retainer pins 30 or 31 so that the respective lower rollers have their bottoms slightly below the lower surface 22 of the frame 16, and the upper rollers have their tops below the upper surface 18 while supported by the lower rollers, as depicted in FIGS. 3-5. Conversely, when the frame 16 is resting on a floor or other supporting surface, the floor pushes the respective lower groups of rollers and their respective cartridges upwardly, thereby also pushing the respective upper groups of rollers and their respective cartridges upwardly above the upper surface 18 of the frame 16. This enables the upper surface 18 of the frame 16 to be inserted easily beneath the underside of a load by the forward rotation of the lower rollers against the floor, and their resultant simultaneous frictional rearward counter-rotation of the upper rollers against the underside of the load during the insertion process. During such insertion, the wheels 29 on the hinges 13 provide further rolling contact with the floor, while the hinges 13 maximize the number of lower rollers in frictional contact with the floor by permitting the bottom surface 22 of the frame to automatically pivot upwardly into a parallel relationship with the floor even though the lift truck mast may be tilted forwardly.

Considering each of the separate roller cartridges and its respective plurality 28a, b, c, d, e or f of upper and lower rollers, at least a majority, and preferably all, of the lower rollers of each cartridge are of a uniform diameter, and are separated from each other by respective different sets of nonuniform spacings, such as a, b, c in FIG. 7A or spacings d-r in FIGS. 7B-F, of progressively increasing size within each separate cartridge in the longitudinal forward direction 24. Such nonuniform spacings are predetermined by nonuniform spacings, along the same direction, of the previously described vertically elongate slots 36 in the cartridge sideplates which contain the ends of the roller axels 35. Preferably, at least a majority of the upper rollers of the same cartridge are of a uniform diameter preferably equal to that of the lower rollers, and are supported in longitudinally offset frictional rolling contact with the aforementioned lower rollers, with all but the rearmost upper roller being positioned over a respective one of the nonuniform spacings of the lower rollers so that each such upper roller is positioned at a respective different height by rolling contact with different pairs of two lower rollers. The rearmost upper roller is supported by the rearmost lower roller at a respective different height as determined by its position of contact with the rearmost lower roller and the position of its respective axle slot 36, as exemplified by FIG. 7A.

As a result of the foregoing arrangement, the upper rollers are supported by rolling contact with the lower rollers at respective different angular offsets and resultant respective different heights relative to the lower rollers, such that the respective heights of the upper rollers decrease progressively in the longitudinal direction 24 toward the front end 20 of the frame to correspond substantially to the downward slope of the tapered frame's upper surface 18, and to the decreasing thickness of the tapered frame 16 in the longitudinal direction 24.

As is further exemplified by FIGS. 6 and 7A-F, each plurality of rollers such as 28b which is located more forwardly relative to the front end 20 of the tapered frame 16 than the immediately preceding rearward plurality of rollers such as 28a, contains lower roller spacings within its particular plurality which increase progressively in the longitudinal direction 24 but are preferably of a smaller size than sequentially corresponding ones of the immediately preceding nonuniform spacings such as 28a. Moreover, the more forward upper and lower rollers of uniform diameters are preferably of a smaller diametric size than the diameters of the immediately preceding corresponding upper and lower rollers of uniform diameter. This causes the series of upper rollers of the more forward plurality such as 28b to be supported at different heights, with respect to the lower rollers, which further decrease progressively from the different heights of the upper rollers of the immediately preceding plurality such as 28a, thereby producing a smoothly continuous decrease in roller height corresponding substantially to the further downward slope of the tapered frame's upper surface 18 and to the further decrease in thickness of the tapered frame 16.

Also as exemplified by FIGS. 6 and 7A-F, the diameter or diameters of the final upper roller or rollers in each plurality of rollers is preferably less than that of the upper and lower rollers of uniform diameter in the same plurality, to aid the transition to the next more forward plurality of rollers as exemplified by rollers 28a', b', c', d', e', and f', in FIGS. 6 and 7A-F.

As the diameters of the respective different pluralities of rollers decrease in the pluralities closer to the front end 20 of the frame 16, the axial lengths of the respective rollers preferably increase as exemplified by FIG. 2. These axial increases in lengths of the rollers tend to offset the decreasing effective load bearing surface areas of the rollers as their diameters decrease, thereby tending to equalize the load supporting capability of each separate plurality of rollers.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A roller load support comprising:
   (a) an elongate frame having a front end and a rear end interconnected by a respective upper surface and lower surface which converge in a longitudinal forward direction toward said front end;
   (b) said frame having respective pluralities of upper and lower rollers spaced successively, without rolling contact between said respective pluralities, along said forward direction, each of said pluralities having respective roller axes extending transversely to said forward direction;

(c) each of said pluralities having at least a majority of said lower rollers of a respective uniform diameter, said uniform diameter decreasing from plurality to plurality in said forward direction;

(d) each of said pluralities having a different respective set of nonuniform spacings between its lower rollers of uniform diameter, said nonuniform spacings increasing in size progressively within each said set in said forward direction;

(e) each said set of nonuniform spacings having sequentially corresponding ones of said nonuniform spacings which decrease in size progressively from set to set in said forward direction.

2. The load support of claim 1 wherein each of said pluralities has at least a majority of said upper rollers of a respective uniform diameter which decreases from plurality to plurality in said forward direction.

3. A roller load support comprising:
(a) an elongate frame having a front end and a rear end interconnected by a respective upper surface and lower surface which converge in a longitudinal direction toward said front end;
(b) a first plurality of respective upper and lower rollers having respective axes extending transversely to said longitudinal direction, said upper rollers being arranged in a longitudinally spaced upper series adjacent to said upper surface, and said lower rollers being arranged in a longitudinally spaced lower series adjacent to said lower surface;
(c) said lower rollers of said first plurality being separated from each other by respective first nonuniform spacings in said longitudinal direction, and at least some of said upper rollers being positioned over respective ones of said first nonuniform spacings in rolling contact with said lower rollers and at different heights with respect to said lower rollers;
(d) said respective first nonuniform spacings all increasing progressively in size in said longitudinal direction toward said front end so that said different heights decrease progressively in said longitudinal direction toward said front end.

4. The load support of claim 3 wherein said lower rollers of said first plurality have a uniform diameter.

5. The load support of claim 4 wherein at least some of said upper rollers of said first plurality are also of said uniform diameter.

6. The load support of claim 3 including a second plurality of respective upper and lower rollers, spaced longitudinally apart from said first plurality of said rollers toward said front end of said frame, without being in rolling contact with said first plurality, so as to form respective longitudinally spaced further upper and lower series of said rollers, said further lower series of said rollers being separated from each other by respective second nonuniform spacings increasing progressively in size in said longitudinal direction toward said front end so that at least some of said upper rollers of said second plurality are in rolling contact with said lower rollers of said second plurality and at respective heights which further decrease progressively from said heights of said upper rollers of said first plurality.

7. The load support of claim 6, wherein said upper rollers of said second plurality include at least some upper rollers having a uniform diameter smaller than a diameter of at least one upper roller of said first plurality.

8. The load support of claim 6, wherein said lower rollers of said second plurality include at least some lower rollers having a uniform diameter smaller than a diameter of at least one lower roller of said first plurality.

9. A roller load support comprising:
(a) an elongate frame having a front end and a rear end interconnected by a respective upper surface and lower surface which converge in a longitudinal direction toward said front end;
(b) a first plurality of respective upper and lower rollers having respective axes extending transversely to said longitudinal direction, said upper rollers being arranged in a longitudinally spaced upper series adjacent to said upper surface, and said lower rollers being arranged in a longitudinally spaced lower series adjacent to said lower surface;
(c) said lower rollers of said first plurality being separated from each other by respective first nonuniform spacings in said longitudinal direction, and at least some of said upper rollers being positioned over respective ones of said first nonuniform spacings in rolling contact with said lower rollers and at different heights with respect to said lower rollers;
(d) said respective first nonuniform spacings increasing progressively in size in said longitudinal direction toward said front end so that said different heights decrease progressively in said longitudinal direction toward said front end;
(e) said lower rollers of said first plurality having a first uniform diameter.

10. The load support of claim 9 wherein said at least some of said upper rollers of said first plurality are also of said first uniform diameter.

11. The load support of claim 9 including a second plurality of respective upper and lower rollers, spaced longitudinally apart from said first plurality of said rollers toward said front end of said frame, without being in rolling contact with said first plurality, so as to form respective longitudinally spaced further upper and lower series of said rollers, said further lower series of said rollers being separated from each other by respective second nonuniform spacings increasing progressively in size in said longitudinal direction toward said front end so that at least some of said upper rollers of said second plurality are in rolling contact with said lower rollers of said second plurality and at respective heights which further decrease progressively from said heights of said upper rollers of said first plurality.

12. The load support of claim 11, wherein said upper rollers of said second plurality include at least some upper rollers having a uniform diameter smaller than a diameter of at least one upper roller of said first plurality.

13. The load support of claim 11, wherein said lower rollers of said second plurality include at least some lower rollers having a uniform diameter smaller than a diameter of at least one lower roller of said first plurality.

* * * * *